Aug. 6, 1968  L. A. KOLZE ET AL  3,395,885
ZONE VALVES
Filed Sept. 1, 1966  2 Sheets-Sheet 1
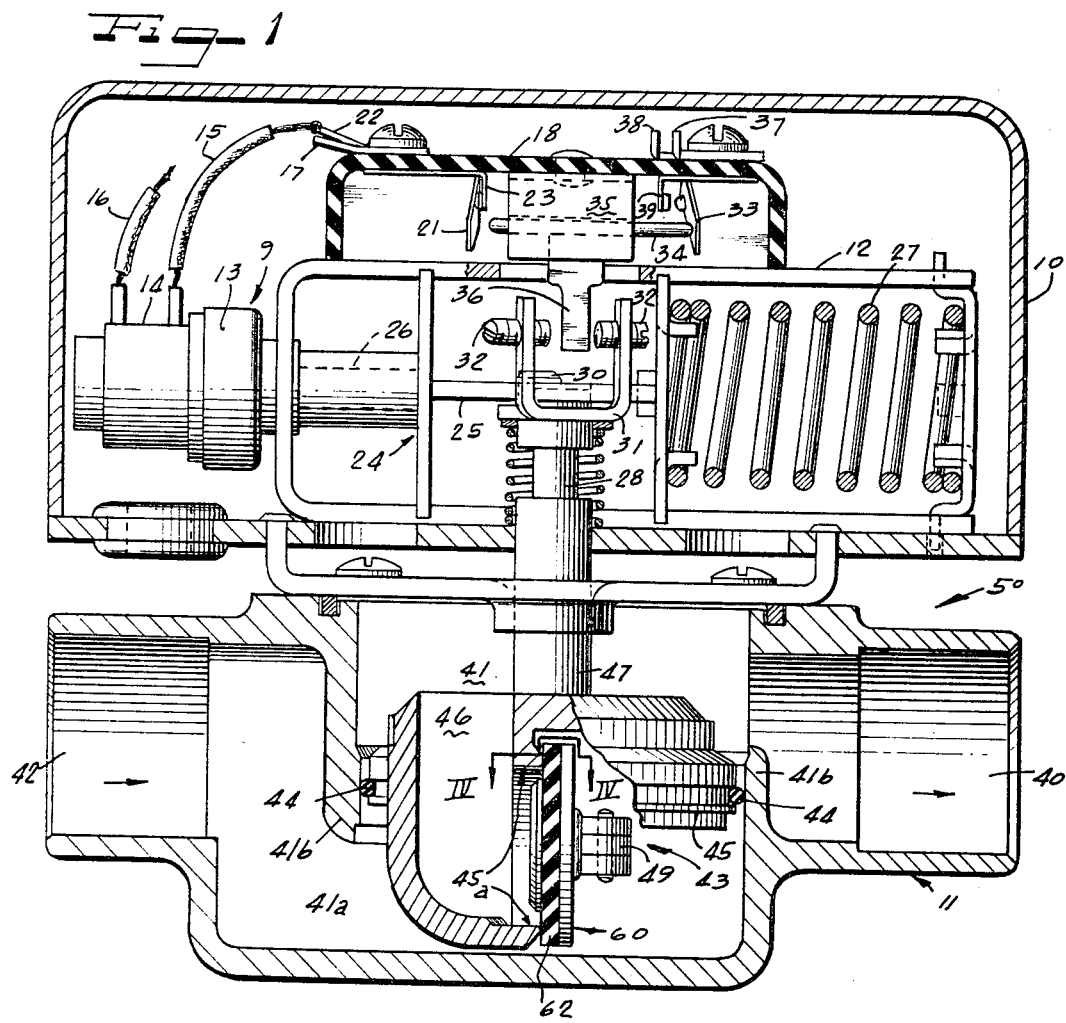
INVENTORS
LAWRENCE A. KOLZE
PAUL W. SCHAFF
NELLO L. BENEDETTI
BY 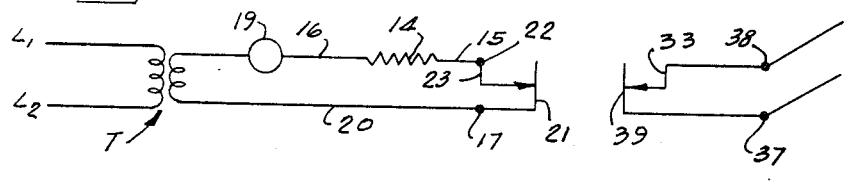
ATTORNEYS Aug. 6, 1968   L. A. KOLZE ETAL   3,395,885
ZONE VALVES
Filed Sept. 1, 1966   2 Sheets-Sheet 2
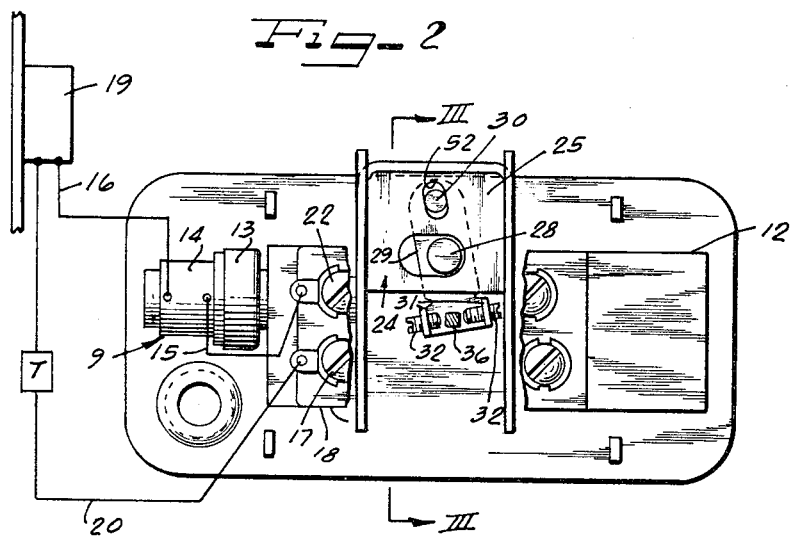
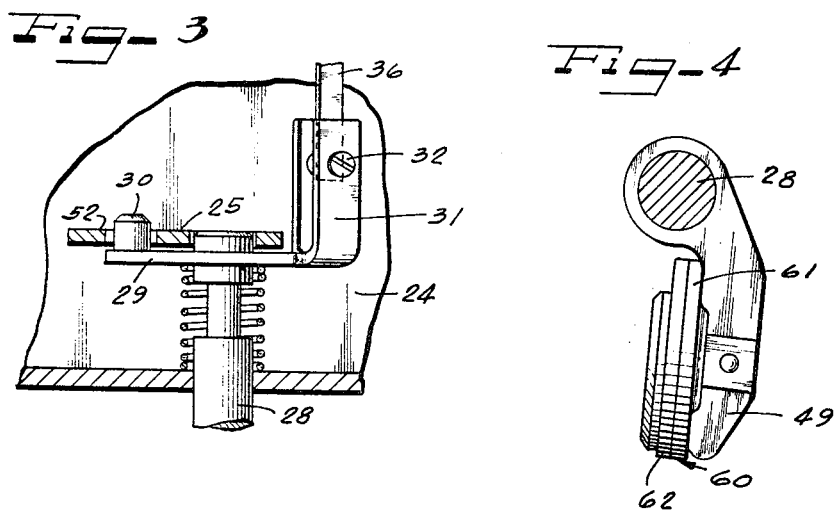
INVENTORS
LAWRENCE A. KOLZE
PAUL W. SCHAFF
NELLO L. BENEDETTI
BY
ATTORNEYS United States Patent Office 3,395,885
Patented Aug. 6, 1968

3,395,885
ZONE VALVES
Lawrence A. Kolze, Bensenville, Paul W. Schaff, Arlington Heights, and Nello L. Benedetti, Mount Prospect, Ill., assignors to The Dole Valve Company, Morton Grove, Ill., a corporation of Illinois
Filed Sept. 1, 1966, Ser. No. 576,626
1 Claim. (Cl. 251—11)

ABSTRACT OF THE DISCLOSURE

This invention is directed to a zone valve with a valve housing having an inlet and an outlet and a fluid chamber therebetween. The inlet and outlet are formed to be in communication with different portions of the chamber. Also provided is a fluid flow control mechanism which is in sealing contact with the walls of the chamber so as to divide the input communicating portion from the output communicating portion of the chamber. The fluid flow control mechanism includes a fluid flow member and a valve seat cooperable therewith. The normal movement of the fluid flow member is toward and away from the valve seat formed in the mechanism for varying the fluid flow through the valve housing from a maximum to a minimum in response to a motive element activated in response to a sensed temperature.

---

This invention relates generally to zone valves. More particularly it relates to an automatically actuated zone valve for controlling the flow of the heating or cooling liquid.

Zone valves are commonly employed in liquid heating and cooling systems whereby the temperature of the conditioned space is controlled by regulating the flow of a liquid or heating medium through heat transfer apparatus such as convectors or radiant coils situated within or connected to the conditioned space. The heat flow rate of the liquid medium, required to maintain a predetermined temperature in the conditioned space generally controlled by means of a fluid control zone valve connected to the heat transfer apparatus is a function of, among other things, the temperature of the liquid medium as well as the capacity of the heat transfer apparatus employed in the system.

Operation of the control valve may be controlled by an actuator connected to the valve which senses in response to the temperature, e.g., of a conditioned space. The actuated sensing device may be located either remotely from the valve or locally therewith.

It is a general object of this invention to provide a new and improved zone valve.

It is an object of the invention to provide such a valve in which control response is rapid and sufficient, so as to achieve good overall control of the temperature of a conditioned space.

It is a more specific object of the invention to provide such a valve which the transfer from conditions of minimum fluid flow to maximum fluid flow is achieved quickly in response to the actuator.

It is a further object of the invention to achieve such a zone valve which is interchangeable with other types of zone valves.

It is another object of the invention to provide such a zone valve which is easily assembled and economically manufactured.

In accordance with one feature of the invention, a zone valve is provided with a fluid flow mechanism in which a flow control member is operatively mounted for movement in response to a sensed temperature, to and away, in a direction generally normal to and from a port formed in the body of the valve so as to achieve conditioning of the flow through the valve body from a minimum to a maximum valve.

In accordance with another feature of the invention, a zone valve with a valve body having an inlet and an outlet and defining a fluid chamber with which the inlet and outlet are in communication, is provided. The inlet and outlet are formed to be in communication with different portions of the chamber. Also provided is a fluid flow control mechanism which is in sealing contact with the walls of the chamber so as to divide the input communication portion from the output communication portion of the chamber. The fluid flow control mechanism includes a fluid flow member operatively connected for essential, normal movement to and away from a port formed in the mechanism for varying the fluid flow through the valve from a minimum to a maximum in response to a motive element activated in response to a sensed temperature.

The organization and manner of operation of the invention, together with further objects and advantages thereof may best be understood by reference to the following description taken in connection with the accompanying drawings, in the several figures of which like reference numerals identify like elements, and in which an exemplification of the invention is illustrated.

FIG. 1 is a longitudinal sectional view of a zone valve constructed in accordance with the principles of the present invention;

FIG. 2 is a plan view of the zone valve of FIG. 1 with parts broken away to show interior parts, and a schematic representation of a wall thermostat and a control circuit connection between the zone valve and the wall thermostat;

FIG. 3 is a view taken along the line III—III of FIG. 2, showing the detail of the control mechanism within the valve;

FIG. 4 is a view taken along line IV—IV of FIG. 1, showing part of the structure of the zone valve; and FIG. 5 is a diagrammatical representation of the circuitry for the zone valve of FIGS. 1-4.

As shown on the drawings:

Although the principles of the invention may be employed in various types of zone valves, for definiteness of disclosure the invention will be described in the environment of a remote sensing electrically controlled zone valve. It will be obvious to those skilled in the art that the present invention is equally applicable to local sensing controlled zone valves and to other means than electrical of controlling the activation of the zone valve.

Referring to FIG. 1 there is depicted a zone valve constructed in accordance with the principles of the present invention and generally indicated by the numeral 50. The valve 50 includes an upper part 10 which contains the control mechanism and a lower part 11 which is the portion through which the fluid flows.

Particularly, part 10 comprises a rectangular frame or channel 12 at one end of which is mounted a motive element generally indicated by the numeral 9 which includes a thermally sensitive element 13. The element 9 also comprises an electrical heater assembly 14, having leads 15 and 16 extending therefrom. The assembly 14 is secured to the outer end of the thermally sensitive element 13 in thermal conduction contact therewith. As the control system does not in itself constitute the present invention it will be only briefly described. As is best shown in FIG. 2 the lead 15 extends to a terminal 22 on an insulated terminal block 18 mounted on the channel 12. The terminal 22 in turn is connected to a movable electrical contact 21 which coacts with a stationary contact 23 to complete a circuit through a second terminal 17 and a lead 20 to a source of electrical potential, one side of the secondary of a transformer T. As best depicted in FIG. 5 the other side of the secondary of transformer T is connected through temperature sensitive activating means, in this case a conventional thermostat 19, and lead 16, to one side of the heater coil of assembly 14 from which a lead 15 completes the circuit by connecting the other side of the heater coil with terminal 22. The primary of transformer T may be connected to electric powerlines $L_1$ and $L_2$.

Returning to FIG. 1, it is seen that the channel 12 carries a transverse slider 24 which is generally H-shaped in cross-section with a horizontal plate 25 oriented longitudinally with respect to the channel 12, representing the cross bar of the H. Thermally sensitive element 13 has a captivated thermal expanding material for operating a plunger 26 bearing against the slider 24. Thus, if the element 13 is energized, the plunger 26 will move outward, exerting force against the slider to move the slider relative to the channel 12. When the element 13 is deenergized, the plunger 26 is retracted by means of a spring 27 which is affixed to the opposite end of the slider 24 to absorb energy from the movement of the slider 24 and to restore its position as plunger 26 retracts.

As shown in FIGS. 1, 2 and 3, a shaft 28 journaled for rotation in and extending from the valve body 11 of the valve 50 carries a radially extending lever 29 at its upper end. The lever 29 has a pin 30 at one end and a U-shaped portion 31 at the other end. The U-shaped portion 31 has an adjustment screw 32 in each leg. As the plate 25 is moved relative to the channel 12 by the plunger 26, the pin 30 which protrudes through the oblong aperture 52 in the plate 25 is also moved. The pin 30, however, extends from the lever 29 which is secured to the shaft 28. Therefore, when the pin 30 is moved, the shaft 28 is rotated. It is noted that the terminal block 18 is mounted atop the frame 12 and has two movable contacts 21 and 33 operable by the slider 24. The slider 24 is slidably mounted within a cavity (not shown) in the block 35 and has a finger 36 depending therefrom to a point between the adjustment screws 32.

It is observed that as the lever 29 is rotated about the shaft 28 by the aforementioned relationship of the plate 25 and the pin 30, the finger 36 is moved laterally by engagement with adjustment screws 32. As the finger 36 is moved, the rod 34 slides in block 35 to engage the movable contact 21 and release movable contact 33. When the movable contact 21 breaks away from the stationary contact 23, the circuit is opened to the heater assembly 14. The spring 27 slowly returns the plunger 26 to its retracted position as the temperature of the thermally sensitive element 13 drops.

It will be appreciated that the terminals 37 and 38 (connected to the stationary contact 39 and movable contact 33, respectively) can be placed in an auxiliary control circuit to control any desired type of apparatus, such as a blower motor, circulatory pump, or the like, which is to be operated under the influence of the thermostat 19.

In accordance with the present invention, the valve body 11 of the valve 50 comprises a fluid inlet 42, a substantially cylindrical-shaped fluid chamber 41 and an outlet 40. Affixed between the input and output exit ports 40 and 42, separating the upper portion of the fluid chamber 41 from the lower portion which is part of a secondary fluid chamber 41a, is a unique zone valve variable flow mechanism generally indicated by the numeral 43. The mechanism 43 has a generally circular outer periphery in sealing contact, by means of an O-ring seal 44, with the generally cylindrical walls 41b of the zone 41. The mechanism 43 has a body 45 defining a passage 46 between zones 41 and 41a. The passage is formed into a generally circular or annular opening or port at 45a opening into zone 41a and facing away from the input 42 opening into zone 41a. The body 45 is rigidly affixed against the cylinder walls 41b of the generally cylindrical-shaped zone 41. The body 45 further includes a bearing sleeve 47 for bearing the shaft 28. The shaft 28 passes through the body 45 into the area of the zone 41a. The base of the shaft 28 is rigidly affixed to a transverse oriented lever arm 49 which is affixed near its outer end to a disc-shaped flow stopping member 60. The disc-shaped member 60 comprises a backing member 61 and an annular-shaped abutting sealing ring 62 affixed about its outer periphery extending to form one part of its surface. The ring 62 of member 60 is positioned for mating with the port 45a of the passage 46 when the member 60 is positioned against the port 45a for stopping fluid flow therethrough.

It should be noted that the fluid flow control mechanism 43 is adapted to be readily inserted into the cylindrical area 41, 41a and is sealable between cylindrical walls 41b. This construction offers the advantage of allowing ease of assembly of the upper portion 10 with its attached mechanism 43, and the valve body 11. It has the further advantage of allowing other fluid flow mechanisms and controls to be substituted within the body 11. This feature is especially useful in replacing or repairing zone valves already installed in operation without disengaging the body 11 from its connections.

In operation, the zone valve 50 is placed in a desired location in a fluid line. The thermostat 19 is placed within the zone, the temperature of which it is to regulate. The valve 50 is normally closed. As the temperature adjacent the thermostat 19 drops to a predetermined level, the slider 13 shifts to the right, the U-shaped member 31 pivots to the left, the slider 34 shifts to the left, and an electrical potential is applied across the leads 15 and 16. The movable contact 21 is normally in engagement with the stationary contact 23 so that if a potential is applied across the leads 15 and 16, the heater assembly 14 will be energized. As the heater assembly 14 warms, the temperature of the thermally sensitive element 13 rises—causing the plunger 26 to move outward against the slider 24. The plate 25 engages the pin 30 on the lever 29 and pivots the lever 29, which imparts rotational movement to the shaft 28. As the shaft 28 rotates, the lever arm 49 pivots about the shaft 28 laterally moving the fluid-flow control member 60 generally normally away from and out of the opening 45a of the passage 46, allowing fluid to immediately flow through the passage 46 and therefore through the valve 50. The action of the valve or fluid-flow control member 60 is immediate as its motion is only a slight degree away from the opening of the passage 46 and allows the heating fluid to immediately flow about the member 60. It is preferred that the member 60 be oriented, as shown, facing the direction of flow so an opening that opens with the direction of flow from the opening 42 into chamber 41a. In this manner, the fluid pressure and flow of the chamber may be used to achieve a quick opening in response to the sensed control signals which institute the opening of the valve. It has been found that the operation of the member 60 is quick to respond to the activation of inherently low power and rather slow reacting element 13 so as to achieve a short lag time between sensed temperature changes and activation.

Energization of the heater assembly 14 causes the slide 24 to move toward the right, the U-shaped end of the member 29 to pivot to the left, and the slider 34 to shift to the left to open the switch 21, 23, and break the heater assembly circuit, whereupon the cycle is again repeated.

As is now obvious a new and improved zone valve has been provided. The above-described valve is able to achieve good overall control of the temperature of a conditioned space in response to a sensed temperature by means for quickly transferring from a condition of minimum flow to a condition of maximum flow. In addition, the valve is of economic construction and is easily assembled.

It will be apparent that many modifications and variations may be effected without departing from the scope and the novel concepts of the present invention.

We claim:

1. In a zone valve comprising a thermally sensitive element having an operating plunger extending therefrom, an electrical heater assembly adjacent said thermally responsive element, a frame, said thermally responsive element mounted on said frame, an H-shaped slider on said frame, one end of said opening plunger adjacent said slider, whereby movement of said operating plunger slides said slider on said frame, said slider including a plate having an oblong aperture therein, a rotatable control shaft, a first lever secured intermediate its ends to a first end of said shaft said lever including a pin at one end thereof, said pin extending into said oblong aperture in said plate, whereby sliding movement of said slider moves said pin in an arc and rotates said shaft, said lever also including a U-shaped portion at the other end thereof, each leg of said U having an adjustable member mounted thereon, a source of electrical potential, a switch mounted on said frame, said switch including a plurality of contacts, each said contact having a movable element and a stationary element, one pair of said contacts being in a circuit including said electrical heater assembly and said source of electrical potential, a rod slidably mounted on said frame between said movable elements, an end of said rod adjacent each of said movable elements, said rod having a finger extending laterally therefrom, said finger extending between said adjustable members on said U-shaped portion of said lever, whereby movement of said finger by said adjustable members in one direction closes one of said pairs of contacts to complete said circuit including said electrical heater and source of electrical potential, a valve body mounted on said frame including said electrical heater and source of electrical potential, a valve housing mounted on said support including an inlet and an outlet and a chamber communicating said inlet and outlet, a second end of said control shaft extending into said chamber, wherein the improvement in said valve body comprises:

a second laver arm radially affixed to said shaft at said other end of said shaft with said body for pivotal displacement within said body, a disc-shaped flow control member affixed transversely to said arm for lateral motion therewith from a first position in which said disc-shaped member completely blocks fluid flow through a passageway formed in said valve body and a second position in which said fluid may flow through said passageway.

References Cited

UNITED STATES PATENTS

| 2,391,342 | 12/1945 | Peterson et al. | 236—68 X |
| 3,181,790 | 5/1965 | Smith | 236—12 |
| 3,273,850 | 9/1966 | Kolze | 251—11 |

FOREIGN PATENTS 856,234   12/1960   Great Britain.

ROBERT A. O'LEARY, *Primary Examiner.*

W. E. WAYNER, *Assistant Examiner.*